(12) United States Patent
Ardö et al.

(10) Patent No.: US 10,498,949 B2
(45) Date of Patent: Dec. 3, 2019

(54) METHOD OF FOCUSING A CAMERA

(71) Applicant: Axis AB, Lund (SE)

(72) Inventors: Björn Ardö, Lund (SE); Sebastian Hultqvist, Lund (SE)

(73) Assignee: AXIS AB, Lund (SE)

(*) Notice: Subject to any disclaimer, the term of this patent is extended or adjusted under 35 U.S.C. 154(b) by 0 days.

(21) Appl. No.: 16/009,693

(22) Filed: Jun. 15, 2018

(65) Prior Publication Data

US 2018/0376052 A1 Dec. 27, 2018
US 2019/0215439 A9 Jul. 11, 2019

(30) Foreign Application Priority Data

Jun. 26, 2017 (EP) .................................... 17177830

(51) Int. Cl.
*H04N 5/232* (2006.01)
*H04N 5/225* (2006.01)
(Continued)

(52) U.S. Cl.
CPC ....... *H04N 5/23212* (2013.01); *H04N 5/2257* (2013.01); *H04N 5/23245* (2013.01); *H04N 5/23299* (2018.08)

(58) Field of Classification Search
CPC ........... H04N 5/23212; H04N 5/23299; H04N 5/232123; H04N 5/23245; H04N 5/2257;
(Continued)

(56) References Cited

U.S. PATENT DOCUMENTS 4,236,794 A * 12/1980 Gordon .................... G02B 7/30
348/347
5,517,236 A * 5/1996 Sergeant .......... G08B 13/19626
348/143
(Continued)

FOREIGN PATENT DOCUMENTS

CN 103841333 A 6/2014
CN 105763795 A 7/2016
(Continued)

OTHER PUBLICATIONS

European Search Report dated Dec. 5, 2017 for Application No. 17177830.1-1905.
(Continued)

*Primary Examiner* — Albert H Cutler
(74) *Attorney, Agent, or Firm* — Xsensus LLP

(57) ABSTRACT

A method of focusing a camera with a movable field of view includes obtaining a current field of view setting corresponding to a current field of view of the camera, retrieving, based on the obtained current field of view setting, focusing data pertaining to the focusing method that was previously used to focus the camera for a previous field of view, at least partly overlapping the obtained current field of view, by accessing a focusing assisting database comprising a plurality of camera focusing entries. wherein each camera focusing entry includes a respective previous field of view setting, corresponding to a respective previous field of view and thereto associated focusing data pertaining to the focusing method that was previously used to focus the camera for the respective previous field of view.

14 Claims, 4 Drawing Sheets

(51) Int. Cl.
*H04N 7/18* (2006.01)
*G02B 7/28* (2006.01)

(58) Field of Classification Search
CPC ............ H04N 7/183; H04N 5/232121; H04N 5/232122; H04N 5/232127; H04N 5/23218; H04N 5/23219; H04N 5/23238; H04N 5/23296; H04N 5/23216; H04N 5/235; H04N 5/247; H04N 5/232; G02B 7/28; G06K 9/00771; G08B 13/194–19613
See application file for complete search history.

(56) References Cited

U.S. PATENT DOCUMENTS

| | | | |
|---|---|---|---|
| 9,787,891 B2 * | 10/2017 | Kamiya | G03B 13/16 |
| 9,813,604 B2 * | 11/2017 | Matsuda | H04N 5/76 |
| 9,854,155 B1 * | 12/2017 | Sikka | H04N 5/23216 |
| 2006/0170813 A1 | 8/2006 | Morofuji | |
| 2009/0202235 A1 | 8/2009 | Li et al. | |
| 2013/0021433 A1 * | 1/2013 | Belsarkar | H04N 7/181 348/36 |
| 2014/0253783 A1 | 9/2014 | Springer et al. | |
| 2016/0165124 A1 | 6/2016 | Chen et al. | |

FOREIGN PATENT DOCUMENTS

| | | |
|---|---|---|
| EP | 2747414 A1 | 6/2014 |
| GB | 2258967 A | 2/1993 |

OTHER PUBLICATIONS

Henriksson, L., et al., "Search Report—Self-Learning Autofocus", UPPDRAGSHUSET, 2 Pages total (Apr. 4, 2017).

* cited by examiner

METHOD OF FOCUSING A CAMERA

The present application claims priority to European Patent Application, 17177830.1, filed Jun. 26, 2017, the entire contents of which being incorporated herein by reference.

TECHNICAL FIELD

The present invention relates to a method of focusing a camera with a movable field of view.

BACKGROUND

Monitoring cameras also referred to as surveillance cameras are frequently used to observe objects and activities in a scene. Information about what type of objects, the status of the objects and whether there are people or animals in the scene may, for example, be gathered. The monitoring cameras are advantageously digital network cameras allowing a remote observer to view image data captured by the camera and transferred via a network. To provide useful information to the observer, it is crucial that the camera is correctly directed such that objects of interests are within the field of view of the camera and the objects are in focus.

Pan-Tilt, PT, cameras allow, in contrast to stationary cameras where the field of view is set at the installation, for a movable field of view. Different regions of a scene may thereby be monitored. PT camera allows for an object to be followed and motion tracking techniques may further be provided allowing an object to be followed automatically even if it moves out from the field of view. Pant-Tilt-Zoom, PTZ, cameras offers improved performance as an adjustable zoom level allows for a transition from a long shot to a close-up viewing of an object or vice versa. Object of interest within a scene may thereby be viewed in greater detail.

Monitoring cameras using autofocusing methods simplifies the handling of the camera as ideally the camera will capture a clear image independent on if the field of view is changed by a tilt motion, pan motion and/or by zooming. It is, however, challenging to efficiently find focus as the field of view is changed, especially for scenes with low light or low contrast, that contains a lot of noise or where there are dramatic changes in light. To this end, rapid movements or other changes to the scene may result in lost focus and refocusing is needed to recover a clear image of the scene or objects within the scene. There is therefore a risk of information being lost as it may take some time for the camera to find focus. The observer may further feel discomfort as the focus appears to be coming and going repeatedly.

Thus, there is a need for more efficient focusing methods to focus a monitoring camera, in particular for PTZ cameras where the field of view is changed repeatedly.

SUMMARY OF THE INVENTION

In view of the above, it is an object of the present invention to provide an improved method of focusing a camera with a movable field of view. A further object is to provide a method for focusing a camera for a current field of view by using information pertaining to the focusing method that was previously used to focus the camera for a previous field of view at least partly overlapping the current field of view.

It is further an object to mitigate, alleviate or eliminate one or more of the above-identified deficiencies in the art and disadvantages singly or in any combination and solve at least the above mentioned problem.

According to a first aspect a method of focusing a camera with a movable field of view, the camera monitoring a scene, is provided. The method comprising: obtaining a current field of view setting corresponding to a current field of view of the camera, retrieving, based on the obtained current field of view setting, focusing data pertaining to the focusing method that was previously used to focus the camera for a previous field of view, at least partly overlapping the obtained current field of view, by accessing a focusing assisting database, comprising a plurality of camera focusing entries, wherein each camera focusing entry comprises a respective previous field of view setting, corresponding to a respective previous field of view, and thereto associated focusing data pertaining to the focusing method that was previously used to focus the camera for the respective previous field of view, focusing the camera using a focusing method chosen among a plurality of focusing methods, wherein the choice of focusing method is based on the retrieved focusing data.

An advantage is that information pertaining to which focusing method that was previously used for a previous field of view, at least partly overlapping with the obtained current field of view, may be reused. Knowledge gained during the previous focusing of the camera may thereby be used. A more effective focusing of the camera may be obtained. In other words, an improved method of focusing the camera for a current field of view is achieved by using information pertaining to a previous focusing method that was previously used to focus the camera for a previous field of view at least partly overlapping the current field of view. A faster focusing of the camera is thereby achieved.

Each focusing method may comprise one or more focusing algorithms for focusing the camera.

The focusing method may thereby comprise a set of focusing algorithms. The order of the algorithms may differ between different focusing methods. Two different focusing methods may comprise the same focusing algorithms, but arranged in different order. Thus, the sequence of focusing algorithms may be different in different focusing methods. The focusing of the camera may comprise use of one or more focusing algorithms from a plurality of focusing algorithms.

By using information pertaining to the focusing algorithm or focusing algorithms that were used in the previous focusing of the camera more effective focusing of the camera is achieved. Knowledge on the order of the focusing algorithms of the focusing method may further be used to efficiently focus the camera.

The wording focusing algorithm may be construed as an algorithm by which a camera may find focus for a field of view. Sharp images of an object or objects within a field of view may thereby be achieved.

Different focusing algorithms may comprise the same algorithmic steps, but have different parameter settings. The parameter settings may for example be input values, ranges, camera step length, near-far field viewing ranges etc.

The field of view may be construed as the extent of the scene that is imaged by the camera at any given moment. The field of view may be understood as the solid angle through which a detector of the camera is sensitive to electromagnetic radiation. In other words, the field of view may be described as the angular extent of a given scene that is imaged by a camera at a given time. A viewing direction may be associated with a field of view, i.e. direction along which the camera is arranged to image the scene. The field of view may be referred to angle of view.

The wording "previous field of view at least partly overlapping with the obtained current field of view" may be construed as that at least a portion of the scene is comprised in both the current and the previous field of views. The current and the previous field of view may be identical, i.e. there is substantially a one-to-one correspondence. The current field of view may be a zoom in or zoom out of the previous field of view. Thus, the current and the previous field of view settings may be the same or differ.

The obtaining of a current field of view setting for the camera may be by determining a field of view setting for the camera. The determining of the field of view setting may be by assessment of the orientation of the camera. The obtaining a field of view setting for the camera may be by accessing data pertaining to a field of view setting for the camera. The data may be manually entered by a user of the camera or comprise data read out from circuitry configured to adjust or determine the field of view of the monitoring camera, e.g. by motors and/or sensors. The field of view setting may be a value or values associated with the orientation and/or degree of zoom of the camera.

The camera may be a monitoring camera.

The camera may be a network camera.

The camera may be a Pant-Tilt-Zoom, PTZ, camera.

The camera may be a zoom camera. The focal length of a camera lens of the zoom camera may be altered such that the field of view is changed. The direction of the camera may be the same for different values of zoom.

The respective camera focusing entry may further comprise a length of time for the respective focusing method to find focus, wherein the choice of focusing method is based on the retrieved focusing data and the length of time for the respective focusing method to find focus.

The method thereby allows for selection and deselection of focusing methods based on the length of time needed to find focus when previously focusing the camera.

The choice of focusing method may be based on the retrieved focusing data and the shortest length of time for the respective focusing method to find focus.

A focusing method may alternatively be chosen based on how fast it found focus when previously focusing the camera for the previous field of view.

The choice of focusing method may be based on the retrieved focusing data and the longest length of time for the respective focusing method to find focus.

A focusing method may thereby be excluded based on how slowly it found focus when previously focusing the camera for the previous field of view.

The respective camera focusing entry may further comprise data pertaining to an oscillatory behavior of the respective focusing method when finding focus, wherein the choice of focusing method is based on the retrieved focusing data and the data pertaining to the oscillatory behavior.

The wording oscillation may be understood as a scenario where the camera focuses back and forth repeatedly without achieving a focus, e.g. changes the focal length of a camera lens of the camera in order to find focus. The oscillatory behavior may therefore persist until focus is found. A found focus may be referred to as a focus lock. The oscillatory behavior of the camera may be referred to as hunting. The oscillatory behavior may cause discomfort for a user using the camera for viewing a scene as the sharpness of the observed image may be experienced as constantly shifting.

The oscillatory behavior may be understood as the one or more physical measurables selected from the group consisting of oscillation amplitude, oscillation damping and oscillation frequency associated with the focusing.

The respective camera focusing entry may further comprise a point in time having a property of being a reoccurring point in time, wherein the choice of focusing method is based on the retrieved focusing data and the point in time.

The wording point in time may be construed as a particular time or time period which reoccurs within a given time span. A point in time may for instances be a time of day, a day of week or a day of year.

The focusing method may thereby be chosen such that it is correlated to a given point in time.

The method may further comprise determining a point in time at which the current field of view setting for the camera was obtained, wherein the respective camera focusing entry further comprises a point in time having a property of being a reoccurring point in time, and wherein the choice of focusing method is based on the retrieved focusing data, the point in time and the determined point in time.

A correlation between the point in time and the determined point in time may be thereby be achieved.

The respective camera focusing entry may comprise object data pertaining to one or more types of objects and thereto associated focusing methods, wherein the method further comprises determining a type of object within the field of view for the camera and wherein the choice of focusing method is based on the determined type of object.

The choice of focusing method may be selected so as to efficiently focus the camera on a given object within the detected field of view.

The respective camera focusing entry may comprise object data pertaining to one or more types of states of an object and thereto associated focusing methods, wherein the method further comprises determining a state of object within the field of view for the camera and wherein the choice of focusing method is based on the determined state of object.

The state of an object may change and an effective method for focusing the camera on the object may be selected based on the state of the object. As an example, the headlight may be on or off on a car and the choice of method may be based on if the light is on or off. An improved focusing of the camera may therefore be achieved.

The one or more focusing algorithms may be selected from the group consisting of hill climb, hill check, quick scan, zoom-auto focus, full search, constant, and assisted focus.

The method may further comprise evaluating, during or after performing the focusing of the camera, the choice of focusing method by determining the length of time to achieve focus, and updating one or more camera focusing entries in the focusing assisting database by changing the focusing method in said plurality of camera focusing entries based on the determined length of time to achieve focus.

The evaluating may comprise applying at least two different focusing methods for focusing the camera, and determining the length of time for each focusing method to find focus, and wherein the method further comprises: updating one or more camera focusing entries in the focusing assisting database by changing the focusing method in said plurality of camera focusing entries to the focusing method having the shortest length of time to find focus.

As a result, the method allows for storing and updating of the focusing assisting database. The method may further comprise evaluating, during or after performing the focusing of the camera, the choice of focusing method, by determining an oscillatory behavior while achieving focus, and updating one or more camera focusing entries in the focusing assisting database by changing the focusing method in said plurality of camera focusing entries, based on the determined oscillatory behavior.

The evaluating may comprise applying at least two different focusing methods for focusing the camera, and measuring the oscillatory behavior while achieving focus for each focusing method, and wherein the method further comprises: updating one or more camera focusing entries in the focusing assisting database by changing the focusing method in said plurality of camera focusing entries to the focusing method based on the oscillatory behavior.

The oscillatory behavior may be associated with one or more physical measurables selected from the group consisting of oscillation amplitude, oscillation damping and oscillation frequency.

As a result, the method allows for storing and updating of the focusing assisting database.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

Figure 1:
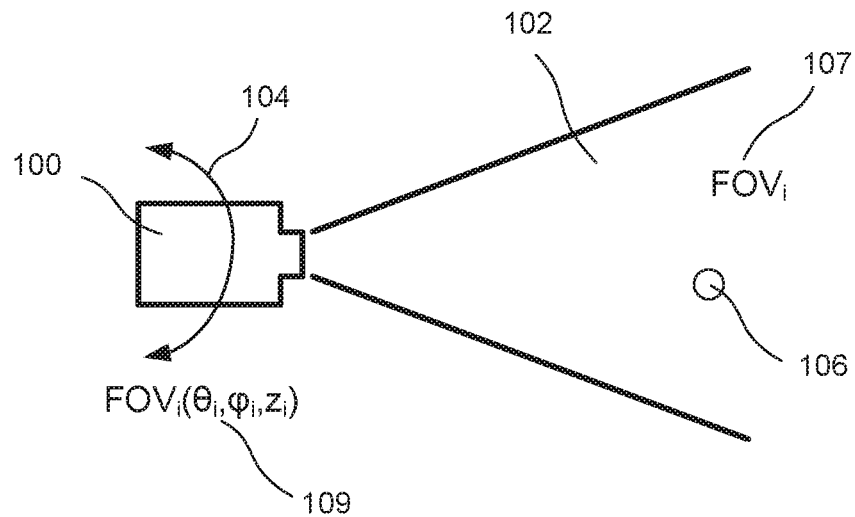
FIG. 1 illustrates a camera for monitoring a scene.

FIG. 1 illustrates a camera 100 monitoring a scene 102. The camera 100 is a network camera in the form of a Pant-Tilt-Zoom, PTZ, camera. The camera 100 may alternatively be network camera in the form of a Pan-Tilt, PT, camera. The camera 100 has a movable field of view, FOV. The FOV may be moved by moving the camera 100 by a rotational motion, θ, along a first rotation angle, see arrow 104, and a rotational motion φ along a second rotational angle, not shown, where φ is perpendicular θ. The camera 100 has a movable zoom level, z, allowing an object 106 in the scene 102 to be imaged at close up or at a distance. The viewing direction of the camera 100 is thus set by the given rotational angles $θ_i$ and $φ_i$. The zoom level is set to $z_i$. The resulting field of view $FOV_i$ 107 of the camera 100 is a dependent on $θ_i$, $φ_i$ and $z_i$.

To this end, a field of view setting, $FOV_i(θ_i,φ_i,z_i)$, 109 for the camera 100 corresponding to the $FOV_i$ 107 of the camera 100 may be obtained. The field of view setting, $FOV_i(θ_i,φ_i,z_i)$ 109 may be determined by assessment of the orientation and the zoom level of the camera 100. The obtaining of a field of view setting for the camera may be by accessing data pertaining to a field of view setting for the camera.

The field of view setting, $FOV_i(θ_i,φ_i,z_i)$, 109 may be recorded on a memory of the camera 100. The camera 100 may comprise the memory and processing circuitry for reading and storing data on the memory. The memory may alternately be physically separated from the camera, e.g. be arranged in a server, accessible by the processing unit of the camera 100

The camera 100 may be equipped with an autofocus utilizing different focusing methods or algorithms for focusing the camera 100, e.g. on the object 106. Autofocus, AF, may be achieved using contrast sensors within the camera, passive AF, or by emitting a signal to illuminate or estimate distance to the subject, active AF, as will be discussed further below. The passive AF may be performed by using contrast detection or phase detection algorithms, but both rely on contrast for achieving accurate autofocus. The present invention is seen as being most useful in relation to passive AF based on contrast detection or in relation to a combination of passive, contrast detection based AF in combination with active AF. The examples below focus mostly on such passive algorithms.

One or several focusing algorithms may be used to focus the camera 100 for a given field of view, $FOV_i$.

Each focusing method may comprise one or more focusing algorithms for focusing the camera 100. As an example, a focusing method, $FM_i$ may comprise a set of focusing algorithms $FA_{i,1}$, $FA_{i,2}$, and $FA_{i,3}$. The one or more focusing algorithms may be selected from the group consisting of hill climb, hill check, quick scan, zoom-auto focus, full search, constant, and assisted focus. The person skilled in the art realizes that other focusing algorithms may be used alternatively or in combination. The full set comprising all the focusing algorithms of the group or a sub set of the focusing algorithms of the group may be used when focusing the camera. The set of $FA_{i,1}$, $FA_{i,2}$, and $FA_{i,3}$ may be the algorithms hill climb, hill check and full search, respectively, in the example above. It should be noted that the sequence of the $FA_{i,1}$, $FA_{i,2}$, and $FA_{i,3}$ focusing algorithms may differ in a different focusing method.

Focusing data, $FD_i$, pertaining to the focusing method $FM_i$ used for focusing the camera 100 for a given field of view, $FOV_i$, 107 may further be recorded. The focusing data, $FD_i$, may be associated to the field of view setting, $FOV_i$ ($\theta_i,\varphi_i,z_i$), 109. An entry may therefore be stored in the memory, the entry comprising the $FOV_i(\theta_i,\varphi_i,z_i)$ and associated focusing data, $FD_i$, e.g. as a text string $FOV_i(\theta_i,\varphi_i,z_i)$; $FD_i$. The field of view setting $FOV_i(\theta_i,\varphi_i,z_i)$, 109 may be associated with a focusing method, $FM_i$, e.g. as a text string $FOV(\theta_i,\varphi_i,z_i)$; $FM_i$. Similarly the entry may comprise one or a plurality of focusing algorithms associated to a given field of view, e.g. $FOV_i(\theta_i,\varphi_i,z_i)$; $FA_i$ or $FOV(\theta_i,\varphi_i,z_i)$; $FA_i$, $FA'_i$.

The field of view setting $FOV_i(\theta_i,\varphi_i,z_i)$; may be a value or values such as $\theta_i$, $\varphi_i$ and $z_i$ associated with the orientation and/or level of zoom of the camera. The field of view setting, $FOV_i(\theta_i,\varphi_i,z_i)$, 109 for the camera 100 may be obtained by determining a field of view setting for the camera 100. The obtaining of a field of view setting, $FOV_i(\theta_i,\varphi_i,z_i)$, 109 for the camera 100 may be by accessing data pertaining to a field of view setting for the camera. The data may be manually entered by a user of the camera or comprise data read out from circuitry configured to adjust or determine the field of view of the monitoring camera, e.g. by motors and/or sensors, not shown.

The focusing data may comprise information on the focusing method used, e.g. the set of focusing algorithms, input parameters for applying the focusing algorithms, and/or output parameters relating to the outcome of the focusing method. The output parameters may, for example, comprise an evaluation of the focusing method, and/or the respective focusing algorithms. The evaluation may be associated with the length of time for the focusing method and/or the respective focusing algorithms to find focus. The evaluation may be associated with an oscillatory behavior of the respective focusing method when finding focus.

To improve the efficiency for future focusing of the camera 100 for a current field of view, i.e. the field of view for the camera at a certain moment, a focusing assisting database may further be built up by using focusing data pertaining to the focusing method that was previously used to focus the camera for the given the field of view, $FOV_i$. More specifically, a focusing assisting database may be built up, where the focusing assisting database comprises a plurality of camera focusing entries. Each camera focusing entry further comprises a respective previous field of view setting corresponding to a respective previous field of view and thereto associated focusing data pertaining to the focusing method that was previously used to focus the camera for the respective previous field of view. As an example, the camera focusing entry may comprise a text string $FOV_i(\theta_i,\varphi_i,z_i)$; $FD_i$, as discussed above.

Figure 2A:
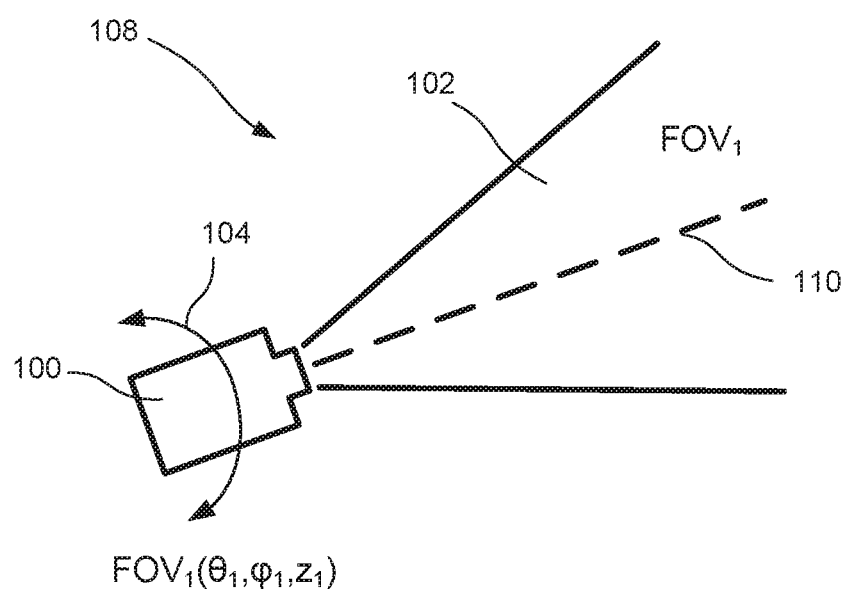
FIG. 2a illustrates a camera when monitoring a scene for a first field of view.
Figure 2B:
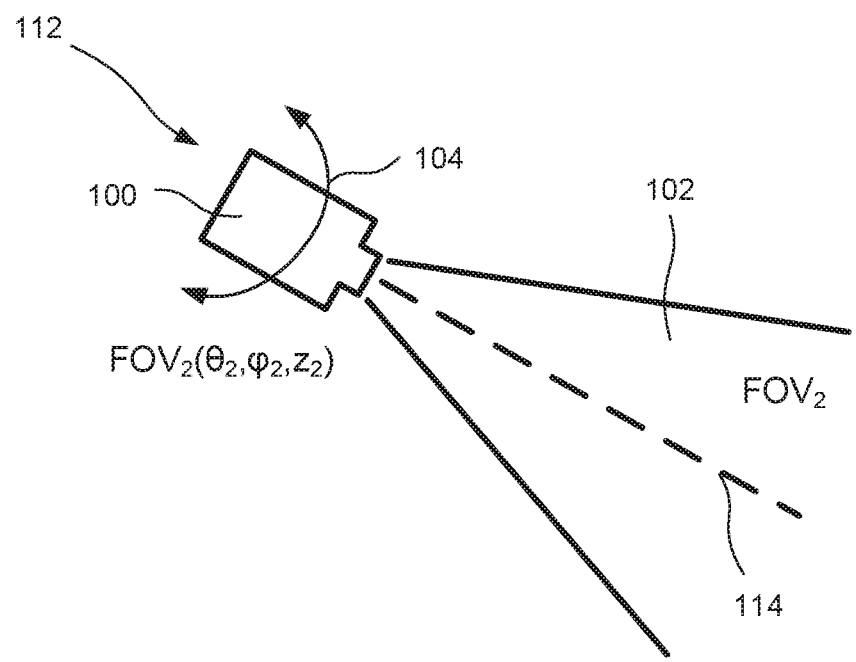
FIG. 2b illustrates the same camera as in FIG. 2a when monitoring a scene for a second field of view.
Figure 2C:
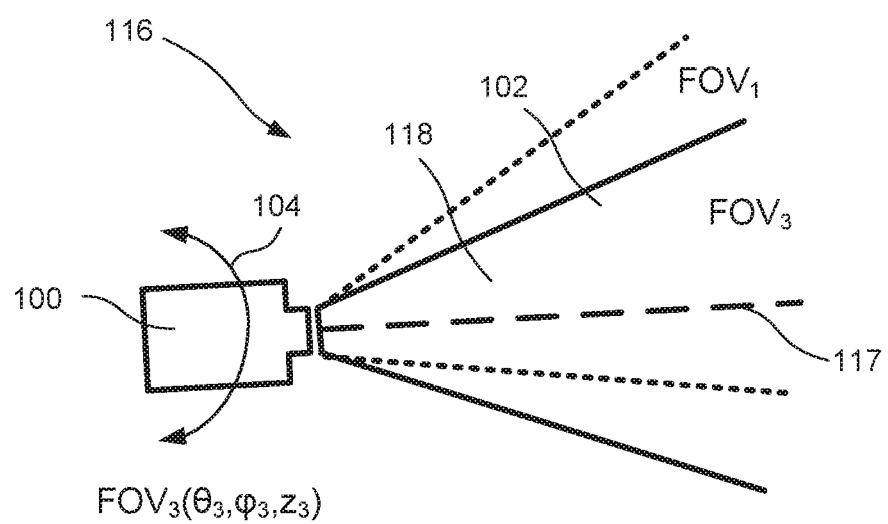
FIG. 2c illustrates the same camera as in FIGS. 2a and 2b when monitoring a scene for a third field of view.

An advantage of providing a focusing assisting database is that historic data, pertaining to the focusing methods that were used previously for a certain field of view, at least partly overlapping the current field of view, can be used for improving the focusing in the current field of view, as will be described next. FIGS. 2a-2c illustrate a camera 100 having a movable field of view, $FOV_i$, at three different situations separated in time. Related, FIG. 4. schematically illustrates a method 200 of focusing a camera 100 utilizing a focusing assisting database.

FIG. 2a illustrates a camera 100 for monitoring a scene 102 in a first situation 108. The field of view, FOV of the camera 100 is set to image the scene 102 in a first direction 110. The viewing direction 110 of the camera 100 is set by rotational motion along the rotational directions $\theta$ and $\varphi$, respectively, to the rotational angles $\theta_1$ and $\varphi_1$, whereby a first field of view, $FOV_1$, of the camera is achieved for a zoom level $z_1$. The $FOV_i$ may further be described by a corresponding field of view setting $FOV_1(\theta_1,\varphi_1,z_1)$ as discussed above.

The camera 100 is configured to use one or more focusing methods, $FM_i$, for focusing the camera for the first field of view, $FOV_1$. Focusing data $FD_1$ pertaining to which focusing method, e.g. focusing method $FM_1$ that was used for focusing the camera 100 for the $FOV_1$ may further be recorded and associated to the field of view setting, FOV ($\theta_1,\varphi_1,z_1$). Thus, a focusing assisting database, not shown, may be built up comprising the focusing data $FD_1$ pertaining to the focusing method $FM_1$ that was used to focus the camera 100 for the first field of view $FOV_1$.

It may be noted that the focusing method $FM_1$ may be a focusing algorithm or comprise a plurality of focusing algorithms.

FIG. 2b further illustrates the same camera 100 for monitoring a scene 102 in a second situation 112. A second field of view $FOV_2$ is obtained by the camera 100 imaging the scene 100 in a second direction 114 with a zoom level $z_2$. The second $FOV_2$ is different to the first field of view $FOV_1$. The zoom levels $z_1$ and $z_2$ may alternatively be the same. For completeness, the $FOV_2$ may be associated with a field of view setting $FOV_2$ ($\theta_2,\varphi_2,z_2$).

Similarly, to the first situation the camera 100, the camera 100 may use one or more focusing methods, $FM_i$, for focusing the camera for the second field of view $FOV_2$. To this end, focusing data $FD_2$ pertaining to which focusing method, e.g. focusing method $FM_2$ that was used for focusing the camera 100 for the $FOV_2$ may be recorded. Thus, the focusing assisting database may also comprise focusing data $FD_2$ pertaining to the focusing method $FM_2$ that was used to focus the camera for the field of view, $FOV_2$.

The person skilled in the art realizes that the camera 100 may be arranged to monitor other regions of the scene than covered by the first and second field of view. Thus, the focusing assisting database may comprise a plurality of camera focusing entries, wherein each camera focusing entry comprises a respective previous field of view setting corresponding to a respective previous field of view and thereto associated focusing data pertaining to the focusing method that was previously used to focus the camera for the respective previous field of view.

By way of example, FIG. 2c illustrates the camera 100 in a third situation 116, which may be referred to as the current field of view. The third field of view, $FOV_3$, is along a direction 117 and differs from the $FOV_1$ and the $FOV_2$, but includes a partial overlap 118 with the first field of view $FOV_1$. The third field of view $FOV_3$ may in other situations be identical to a previous field of view which has been monitored by the camera. For completeness, the $FOV_3$ may be associated with a field of view setting, $FOV_3(\theta_3,\varphi_3,z_3)$ as discussed above.

An improved efficiency for focusing the camera 100 in the third situation 116 may be achieved by using a focusing assisting database as described above. In greater detail, the method 200, see FIGS. 2c and 4, of focusing the camera 100 comprises the act of obtaining 202 a current field of view setting $FOV_3(\theta_3,\varphi_3,z_3)$ corresponding to a current field of view $FOV_3$ of the camera 100. The method 200 then comprises retrieving 204, based on the obtained current field of view setting $FOV_3(\theta_3,\varphi_3,z_3)$, focusing data $FD_1$ pertaining to the focusing method $FM_1$ that was previously used to focus the camera 100 for a previous field of view, $FOV_1$, having an at least partial overlap 118 with the obtained current field of view $FOV_3$, by accessing a focusing assisting database comprising a plurality of camera focusing entries, wherein each camera focusing entry comprises a respective previous field of view setting $FOV_1(\theta_1,\varphi_1,z_1)$, corresponding to a respective previous field of view $FOV_1$ and thereto associated focusing data $FD_1$ pertaining to the focusing method $FM_1$ that was previously used to focus the camera 100 for the respective previous field of view $FOV_1$. The camera 100 may thereafter be focused 206 using a focusing method $FM_1$ chosen among a plurality of focusing methods, wherein the choice of focusing method is based on the retrieved focusing data $FD_1$.

In other words, focusing data $FD_1$ pertaining to the focusing method $FM_1$ that was previously used for the first field of view, i.e. the $FOV_1$, which at least partly overlaps with the third field of view $FOV_3$, may thereby be used to focus the camera 100 for the third field of view $FOV_3$. A focusing method that has previously been used to focus the camera 100 may be used again for the current field of view $FOV_3$. Knowledge gained previously when focusing the camera 100 may thereby be utilized. A more efficient focusing of the method may therefore be obtained. The focusing of the camera 100 in the third situation 116 may thereby be achieved by retrieving, based on the obtained third field of view setting $FOV_3(\theta_3,\varphi_3,z_3)$, focusing data, from the focusing assisting database, by accessing a focusing entry comprising the first field of view, $FOV_1$, and focusing data, $FD_1$, pertaining to the focusing method, $FM_1$, that was used to focus the camera for the first field of view, $FOV_1$.

As each focusing method may comprise one or more focusing algorithms for focusing the camera, focusing data pertaining to the focusing algorithms that were used during the previous focusing of the camera may be used. A further advantage of the method is therefore that fewer focusing algorithms need to be tested when efficiently focusing the camera for the current field of view.

The choice of focusing method may thus comprise a choice of focusing algorithm.

The choice of focusing algorithm may comprise choosing a first focusing algorithm, among a plurality of focusing algorithms, for focusing the camera. The chosen focusing algorithm may be set as an initial focusing algorithm for focusing the camera. The skilled person realizes that the choosing may further comprise choosing additional focusing algorithms. The choosing of focusing algorithm may comprise selecting the order of focusing algorithms of a focusing method. Information on the order of the focusing algorithms comprised in the focusing method previously used for focusing the camera may thus be used.

The focusing data may further comprise information pertaining to parameter settings for the respective focusing algorithms. Thus, the choice of focusing method may be based on the retrieved focusing data and the parameter settings for the respective algorithms. The parameter settings may for example be input values, ranges, camera step length, near-far field viewing ranges.

The respective camera focusing entry may further comprise a length of time for the respective focusing method to find focus, wherein the choice of focusing method is based on the retrieved focusing data and the length of time for the respective focusing method to find focus.

The method thereby allows for selection and deselection of focusing methods based on the length of time needed to find focus when previously focusing the camera.

By way of example, a focusing assisting data base may comprise a plurality of camera focusing entries comprising the same field of view settings for a previous field of view $FOV_i(\theta_i,\varphi_i,z_i)$, but different focusing methods $FM_{i,1}$ and $FM_{i,2}$, each having a length of time, i.e. $t_{i,1}$ and $t_{i,2}$ to achieve focus for the corresponding previous $FOV_i$. Assuming the $t_{i,1}$ is larger than $t_{i,2}$, the choice of focusing method for a current field of view is based on the retrieved focusing data and the shortest length of time, $t_{i,2}$. Thus, a focusing method may be chosen based on how fast it found focus when previously focusing the camera for the previous field of view.

It may be noted that the respective focusing methods may comprise a focusing algorithm or a plurality of focusing algorithms. Thus, the above discussion on the choice of focusing method based on length of time to find focus may be applied to the respective focusing algorithms.

The choice of focusing method may be based on the retrieved focusing data and the longest length of time for the respective focusing method to find focus. A focusing method may thereby be excluded based on how slowly it found focus when previously focusing the camera for the previous field of view. Focusing methods for which the length of time for focusing the camera is longer than a predetermined length of time may thereby be excluded. A faster focusing of the camera may thereby be obtained.

The respective camera focusing entry may further comprise data pertaining to an oscillatory behavior of respective focusing method when finding focus, wherein the choice of focusing method is based on the retrieved focusing data and the data pertaining to the oscillatory behavior.

The oscillatory behavior may be understood as the one or more physical measurables selected from the group consisting of oscillation amplitude, oscillation damping and oscillation frequency associated with the focusing.

The respective camera focusing entry may further comprise a point in time having a property of being a reoccurring point in time, wherein the choice of focusing method is based on the retrieved focusing data and the point in time.

The wording point in time may be construed as a particular time or time period which reoccurs within a given time span. A point in time may for instances be a time of day, a day of week or a day of year.

The focusing method may thereby be chosen such that it is correlated to a given point in time.

In one situation, a method which is efficient for focusing the camera during the day may, for example, be chosen. In another situation, a method which is efficient for focusing the camera during the night may, for example, be chosen. The better choice of method for focusing may thereby be achieved.

By way of example, a focusing assisting database may comprise a plurality of camera focusing entries comprising the same field of view settings for a previous field of view $FOV_i(\theta_i,\varphi_i,z_i)$, but different focusing methods $FM_{i,1}$ and $FM_{i,2}$, each having a different point in time, i.e. $tp_{i,1}$ and $tp_{i,2}$, where $tp_i$ e.g., is a Sunday and $tp_{i,2}$ is a Monday. Information of what day of the week that the respective methods were used to focus the camera for the previous field of view may thereby be used as input for choosing focusing method. In other words, knowledge about which focusing method that was efficient for focusing the camera may thereby be used. For example, a camera viewing a road or a parking lot may require different focusing methods based on the amount of traffic. The amount of traffic may for instance differ between different days of the week or different time points during the day.

The method may further comprise determining a point in time at which the current field of view setting for the camera was obtained, wherein the respective camera focusing entry further comprises a point in time having a property of being a reoccurring point in time, and wherein the choice of focusing method is based on the retrieved focusing data, the point in time and the determined point in time.

A correlation between the point in time and the determined point in time may be thereby be achieved. The choice of focusing method for a current field of view at a detected point in time may apply a focusing method that was efficient for focusing the camera for a previous field of view at that same time point. Focusing methods that are less effective for the detected point in time may be excluded. For example, a focusing method that has proven to be efficient during the day may not be as efficient during the night. Hence, an improved selection of focusing method may be achieve by taking the time of day into consideration.

Figure 3A:
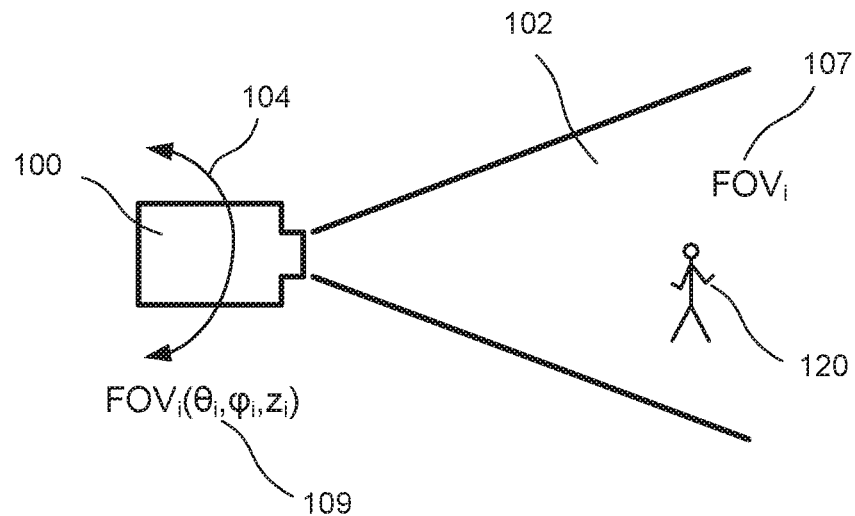
FIG. 3a illustrates a camera for monitoring a scene for a field of view comprising a first object.

FIG. 3a illustrates a camera 100 monitoring a scene 102. The camera 100 has a movable field of view, $FOV_i$, 107. A first object, $O_1$, 120 is present within the field of view $FOV_i$. The camera 100 may use a first focusing method $FM_1$ for focusing the camera such that the first object 120 is in focus. The camera 100 may further be arranged to determine what type of object that is present in the field of view.

The determination of the type of object present in the scene may be performed e.g., by shape recognition or by determining various characterizing properties or object features, such as speed, size or type of motion (swaying, constant etc), of a detected object. The objects may be detected e.g., by motion detection in combination with the use of background models. Other methods may also be employed, e.g., object detection and classification based on Haar cascades or a trained neural network, such as a convolutional neural network trained for this purpose.

The type of object may be stored together with the focusing data pertaining to the focusing method that was used to focus the camera for the field of view in a focusing assisting database. More specifically, a camera focusing entry of the focusing assisting database may comprise object data pertaining to the object 120, exemplified as a human 120. Thus, a camera focusing entry may, as discussed above, comprise a field of view setting corresponding to the field of view, the focusing method and the object, e.g. in the form of a text string $FOV_i(\theta_i,\varphi_i,z_i)$; $FD_1$; $O_1$.

Figure 3B:
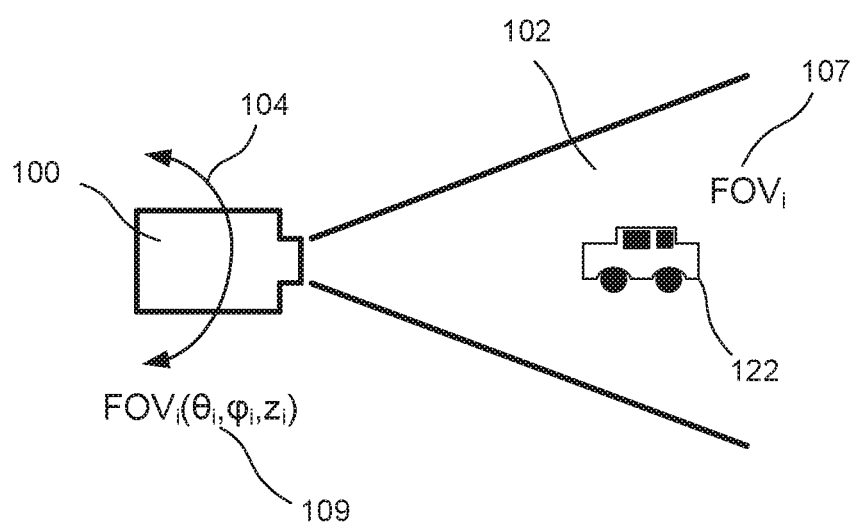
FIG. 3b illustrates the same camera and field of view as in FIG. 3a comprising a second object.

FIG. 3b illustrates the same camera 100 and field of view, $FOV_i$, but a second object 122 is instead present within the field of view $FOV_i$, the second object is exemplified as a car 122. The camera 100 may now use a second focusing method $FM_2$ for focusing the camera 100 such that the second object, $O_2$, 122 is in focus. The second focusing method $FM_2$ may be different from the first focusing method $FM_1$. As discussed in relation to FIG. 3a, the camera 100 may be arranged to determine the type of object present in the field of view. Thus, a camera focusing entry may, as discussed above, comprise a field of view setting corresponding to the field of field of view, the focusing method and the type of object, e.g. in the form of a text string $FOV_i(\theta_i,\varphi_i,z_i)$; $FD_2$; $O_2$.

To this end, the method 200 for focusing the camera may further comprise determining a type of object within the field of view for the camera, wherein the choice of focusing method is based on the determined type of object.

The choice of focusing method may be selected so as to efficiently focus the camera on a given object within the detected field of view. Sharp images of an object of interest may be achieved. Again referring to FIGS. 3a and 3b, if detecting an object such as a car, it may be advantageous to use a fast focusing method, e.g. $FM_2$ which has previously been used to focus on a car, and not a focusing method, such as $FM_1$, which previously has been used to focus on a human.

Figure 4:
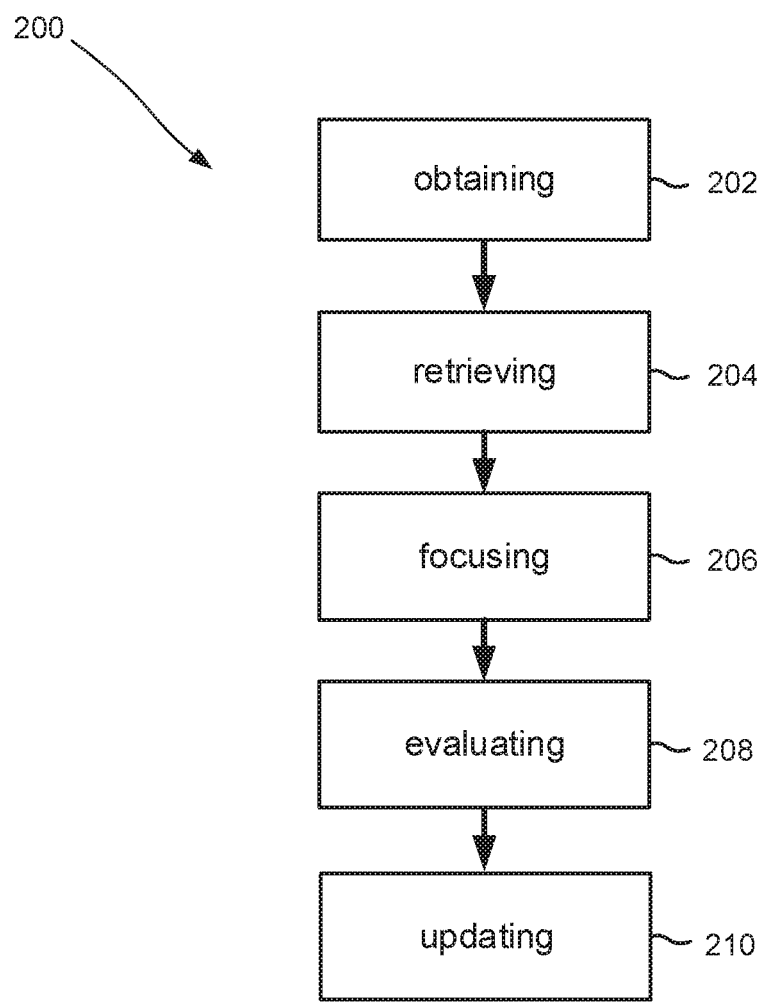
FIG. 4 is a block scheme of a method for focusing a camera.

The method 200 may further comprise evaluating 208, see FIG. 4, during or after performing the focusing of the camera 100, the choice of focusing method by determining the length of time to achieve focus.

The efficiency of focusing the camera when using a focusing method based on the retrieved focusing data may thereby be evaluated. Alternative focusing methods may further be used to focus the camera. As one or more of these focusing methods may be more efficient for focusing the camera 100, the method 200 may further comprise updating 210 one or more camera focusing entries in the focusing assisting database, by changing the focusing method, in said plurality of camera focusing entries, based on the determined length of time to achieve focus.

The evaluating 208 may comprise applying at least two different focusing methods for focusing the camera, and determining the length of time for each focusing method to find focus, and wherein the method further comprises: updating 210 one or more camera focusing entries, in the focusing assisting database, by changing the focusing method, in said plurality of camera focusing entries, to the focusing method having the shortest length of time to find focus.

As a result, the method 200 allows for storing and updating of the focusing assisting database. An updated set of focusing entries comprising faster methods for focusing the camera may thereby be achieved. An update of the focusing method that was previously used to focus the camera for a previous field of view may further be updated. A larger number of focusing entries may further be built up as additional focusing entries and may be recorded in the focusing assisting database.

Again it may be noted that the respective focusing methods may comprise a focusing algorithm or a plurality of focusing algorithms. Thus, the evaluating of the focusing method may comprise determining a length of time to achieve focus for one or more focusing algorithms. To this end, the updating may comprise changing one or more focusing algorithms.

The method 200 may further comprise evaluating 208, during or after performing the focusing of the camera, the choice of focusing method, by determining an oscillatory behavior while achieving focus, and updating one or more camera focusing entries, in the focusing assisting database, by changing the focusing method, in said plurality of camera focusing entries, based on the determined oscillatory behavior.

The evaluating 208 may comprise applying at least two different focusing methods for focusing the camera 100, and measuring the oscillatory behavior while achieving focus for each focusing method to find focus. The method 200 may then further comprise updating 210 one or more camera focusing entries in the focusing assisting database by changing the focusing method in said plurality of camera focusing entries to the focusing method based on the oscillatory behavior.

As a result, the method allows for storing and updating of the focusing assisting database. An updated set of focusing entries comprising methods providing improved oscillatory behavior while focusing the camera may thereby be achieved. An updated set of focusing entries comprising methods providing reduced oscillation amplitude or stronger oscillation damping while focusing the camera may thereby be achieved. An update of the focusing method that was previously used to focus the camera for a previous field of view may further be updated. A larger number of focusing entries may further be built up when additional focusing entries are recorded in the focusing assisting database.

The above discussion on evaluating the choice of focusing method by determining an oscillatory behavior applies correspondingly to an evaluation of one or more focusing algorithms. To this end, one or more camera focusing entries may be updated by changing the focusing algorithms based on determined oscillatory behavior. A more efficient focusing method may thereby be obtained.

The person skilled in the art realizes that the present invention by no means is limited to the preferred embodiments described above. On the contrary, many modifications and variations are possible within the scope of the appended claims.

For example, the camera may be a Pant-Tilt, PT, camera.

Additionally, variations to the disclosed embodiments can be understood and effected by the skilled person in practicing the claimed invention, from a study of the drawings, the disclosure, and the appended claims.

The invention claimed is:

1. A method of focusing a camera with a movable field of view, the camera monitoring a scene, the method comprising:
    obtaining a current field of view setting corresponding to a current field of view of the camera,
    retrieving, based on the obtained current field of view setting, focusing data pertaining to the focusing method that was previously used to focus the camera for a previous field of view, at least partly overlapping the obtained current field of view, by accessing a focusing assisting database, comprising a plurality of camera focusing entries, wherein each camera focusing entry comprises a respective previous field of view setting, corresponding to a respective previous field of view, and thereto associated focusing data, pertaining to the focusing method that was previously used to focus the camera for the respective previous field of view,
    focusing the camera using a focusing method chosen among a plurality of focusing methods, wherein the choice of focusing method is based on the retrieved focusing data,
    wherein each camera focusing entry further comprises a length of time for the respective focusing method to find focus, wherein the choice of focusing method is based on the retrieved focusing data and the length of time for the respective focusing method to find focus.

2. The method according to claim 1, wherein each focusing method comprises one or more focusing algorithms for focusing the camera.

3. The method according to claim 2, wherein the one or more focusing algorithms is selected from the group consisting of hill climb, hill check, quick scan, zoom-auto focus, full search, constant, and assisted focus.

4. The method according to claim 1, wherein the choice of focusing method is based on the retrieved focusing data and the shortest length of time for the respective focusing method to find focus.

5. The method according to claim 1, wherein the choice of focusing method is based on the retrieved focusing data and the longest length of time for the respective focusing method to find focus.

6. The method according to claim 1, wherein the each respective camera focusing entry further comprises data pertaining to an oscillatory behavior of the respective focusing method when finding focus, wherein the choice of focusing method is based on the retrieved focusing data and the data pertaining to the oscillatory behavior.

7. The method according to claim 1, wherein the respective camera focusing entry further comprises a point in time having a property of being a reoccurring point in time, wherein the choice of focusing method is based on the retrieved focusing data and the point in time.

8. The method according to claim 1, wherein the method further comprises determining a point in time at which the current field of view setting for the camera was obtained, wherein the respective camera focusing entry further comprises a point in time having a property of being a reoccurring point in time, and wherein the choice of focusing method is based on the retrieved focusing data, the point in time and the determined point in time.

9. The method according to claim 1, wherein the respective camera focusing entry comprises object data pertaining to one or more types of objects and thereto associated focusing methods, wherein the method further comprises determining a type of object within the field of view for the camera and wherein the choice of focusing method is based on the determined type of object.

10. The method according to claim 1, further comprising evaluating, during or after performing the focusing of the camera, the choice of focusing method by determining the length of time to achieve focus, and updating one or more camera focusing entries in the focusing assisting database by changing the focusing method in said plurality of camera focusing entries based on the determined length of time to achieve focus.

11. The method according to claim 10, wherein the evaluating comprises applying at least two different focusing methods for focusing the camera, and determining the length of time for each focusing method to find focus, and wherein the method further comprises:
    updating one or more camera focusing entries in the focusing assisting database by changing the focusing method in said plurality of camera focusing entries to the focusing method having the shortest length of time to find focus.

12. The method according to claim 1, further comprising evaluating, during or after performing the focusing of the camera, the choice of focusing method, by determining an oscillatory behavior while achieving focus, and updating one or more camera focusing entries in the focusing assisting database, by changing the focusing method, in said plurality of camera focusing entries, based on the determined oscillatory behavior.

13. The method according to claim 12, wherein the evaluating comprises applying at least two different focusing methods for focusing the camera, and measuring the oscillatory behavior while achieving focus for each focusing method, and wherein the method further comprises:
    updating one or more camera focusing entries in the focusing assisting database by changing the focusing method in said plurality of camera focusing entries to the focusing method based on the oscillatory behavior.

14. The method according to claim 12, wherein the oscillatory behavior is associated with one or more physical measurables selected from the group consisting of oscillation amplitude, oscillation damping and oscillation frequency.

* * * * *